(12) United States Patent
Hindy et al.

(10) Patent No.: US 12,047,859 B2
(45) Date of Patent: *Jul. 23, 2024

(54) CONFIGURING REPEATER-ASSISTED COMMUNICATION

(71) Applicant: Lenovo (Singapore) Pte. Ltd., New Tech Park (SG)

(72) Inventors: Ahmed Hindy, Aurora, IL (US); Ali Ramadan Ali, Kraiburg am Inn (DE); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,691

(22) Filed: Apr. 24, 2023

(65) Prior Publication Data
US 2023/0262573 A1 Aug. 17, 2023

Related U.S. Application Data

(63) Continuation of application No. 17/560,607, filed on Dec. 23, 2021, now Pat. No. 11,665,613.

(51) Int. Cl.
*H04W 40/00* (2009.01)
*H04B 7/155* (2006.01)

(52) U.S. Cl.
CPC ...... *H04W 40/005* (2013.01); *H04B 7/15507* (2013.01)

(58) Field of Classification Search
CPC ............ H04W 40/005; H04W 7/15507; H04B 10/2937; H04B 10/298
See application file for complete search history.

(56) References Cited

U.S. PATENT DOCUMENTS

| 11,219,015 | B2 | 1/2022 | Kim et al. | |
|---|---|---|---|---|
| 2013/0211548 | A1* | 8/2013 | Leinen | G05B 19/4148 700/11 |
| 2014/0078950 | A1 | 3/2014 | Jung | |

(Continued)

OTHER PUBLICATIONS

3GPP, 3rd Generation Partnership Project; Technical Specification Group Radio Access Network; NR; Physical layer procedures for data (Release 16), 3GPP TS 38.214 V16.7.0, Sep. 2021, pp. 1-172.

*Primary Examiner* — Dominic E Rego
(74) *Attorney, Agent, or Firm* — Kunzler Bean & Adamson

(57) ABSTRACT

Apparatuses, methods, and systems are disclosed for configuring repeater-assisted communication. One method includes transmitting, from a first network node ("NN"), an indication of repeater-assisted communication to a second NN and a third NN. The method includes transmitting configuration information to the second NN and the third NN. The configuration information includes control information that corresponds to whether the second NN and the third NN are turned on or turned off, the control information corresponding to whether the second NN and the third NN are turned on or turned off is correlated, the control information identifies timing information for the second NN and the third NN, and the timing information indicates whether the second NN and the third NN are expected to transmit a signal received at the second NN and the third NN at a prior time to the first NN and/or a fourth NN based on the configuration information.

20 Claims, 8 Drawing Sheets

(56) References Cited

U.S. PATENT DOCUMENTS

| | | | |
|---|---|---|---|
| 2015/0112510 A1* | 4/2015 | Tokunaga | G06F 1/3206 |
| | | | 701/1 |
| 2015/0348450 A1* | 12/2015 | Park | G09F 3/208 |
| | | | 340/5.91 |
| 2017/0361791 A1* | 12/2017 | Yoon | B60R 16/03 |
| 2019/0181943 A1 | 6/2019 | Liang et al. | |
| 2019/0363664 A1* | 11/2019 | Nakamura | H02P 27/06 |
| 2019/0372655 A1 | 12/2019 | Pinder et al. | |
| 2020/0382200 A1 | 12/2020 | Hormis et al. | |
| 2020/0383075 A1 | 12/2020 | Ashworth et al. | |
| 2021/0067237 A1 | 3/2021 | Sampath et al. | |
| 2021/0068050 A1 | 3/2021 | Sampath et al. | |
| 2021/0105062 A1 | 4/2021 | Abedini et al. | |
| 2021/0194569 A1 | 6/2021 | Ray Chaudhuri et al. | |
| 2021/0298069 A1 | 9/2021 | Abedini et al. | |
| 2021/0306065 A1 | 9/2021 | Abedini et al. | |
| 2021/0306959 A1 | 9/2021 | Abedini et al. | |
| 2021/0306962 A1 | 9/2021 | Abedini et al. | |
| 2022/0069893 A1 | 3/2022 | Abedini et al. | |
| 2022/0174509 A1 | 6/2022 | Noh et al. | |
| 2022/0399984 A1* | 12/2022 | Luo | H04L 5/14 |
| 2023/0093595 A1* | 3/2023 | Nam | H04B 7/0639 |
| | | | 375/262 |

\* cited by examiner

CONFIGURING REPEATER-ASSISTED COMMUNICATION

CROSS REFERENCE TO RELATED APPLICATIONS

This application is a continuation application of U.S. patent application Ser. No. 17/560,607, filed on Dec. 23, 2021, which is incorporated herein by reference in its entirety.

FIELD

The subject matter disclosed herein relates generally to wireless communications and more particularly relates to configuring repeater-assisted communication.

BACKGROUND

In certain wireless communications networks, network coverage may be limited. In such networks, repeaters may be used to extend the network coverage.

BRIEF SUMMARY

Methods for configuring repeater-assisted communication are disclosed. Apparatuses and systems also perform the functions of the methods. One embodiment of a method includes transmitting, from a first network node, an indication of repeater-assisted communication to a second network node and a third network node. In some embodiments, the method includes transmitting configuration information to the second network node and the third network node. The configuration information includes control information that corresponds to whether the second network node and the third network node are turned on or turned off, the control information corresponding to whether the second network node and the third network node are turned on or turned off is correlated, the control information identifies timing information for the second network node and the third network node, and the timing information indicates whether the second network node and the third network node are expected to transmit a signal received at the second network node and the third network node at a prior time to the first network node, a fourth network node, or a combination thereof based on the configuration information.

One apparatus for configuring repeater-assisted communication includes a first network node. In some embodiments, the apparatus includes a transmitter that: transmits an indication of repeater-assisted communication to a second network node and a third network node; and transmits configuration information to the second network node and the third network node. The configuration information includes control information that corresponds to whether a second network node and a third network node are turned on or turned off are correlated, the control information identifies timing information for the second network node and the third network node, and the timing information indicates whether the second network node and the third network node are expected to transmit a signal received at the second network node and the third network node at a prior time to the first network node, a fourth network node, or a combination thereof based on the configuration information.

Another embodiment of a method for configuring repeater-assisted communication includes receiving, at a repeater network node, an indication of repeater-assisted communication. In some embodiments, the method includes receiving configuration information. The configuration information includes control information that corresponds to whether a first repeater node and a second repeater node are turned on or turned off are correlated, the control information identifies timing information for the second network node and the third network node, and the timing information indicates whether the second network node and the third network node are expected to transmit a signal received at the second network node and the third network node at a prior time to the a network node, a fourth network node, or a combination thereof based on the configuration information.

Another apparatus for configuring repeater-assisted communication includes a repeater network node. In some embodiments, the apparatus includes a receiver that: receives an indication of repeater-assisted communication; and receives configuration information. The configuration information includes control information that corresponds to whether a first repeater node and a second repeater node are turned on or turned off are correlated, the control information identifies timing information for the second network node and the third network node, and the timing information indicates whether the second network node and the third network node are expected to transmit a signal received at the second network node and the third network node at a prior time to the a network node, a fourth network node, or a combination thereof based on the configuration information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
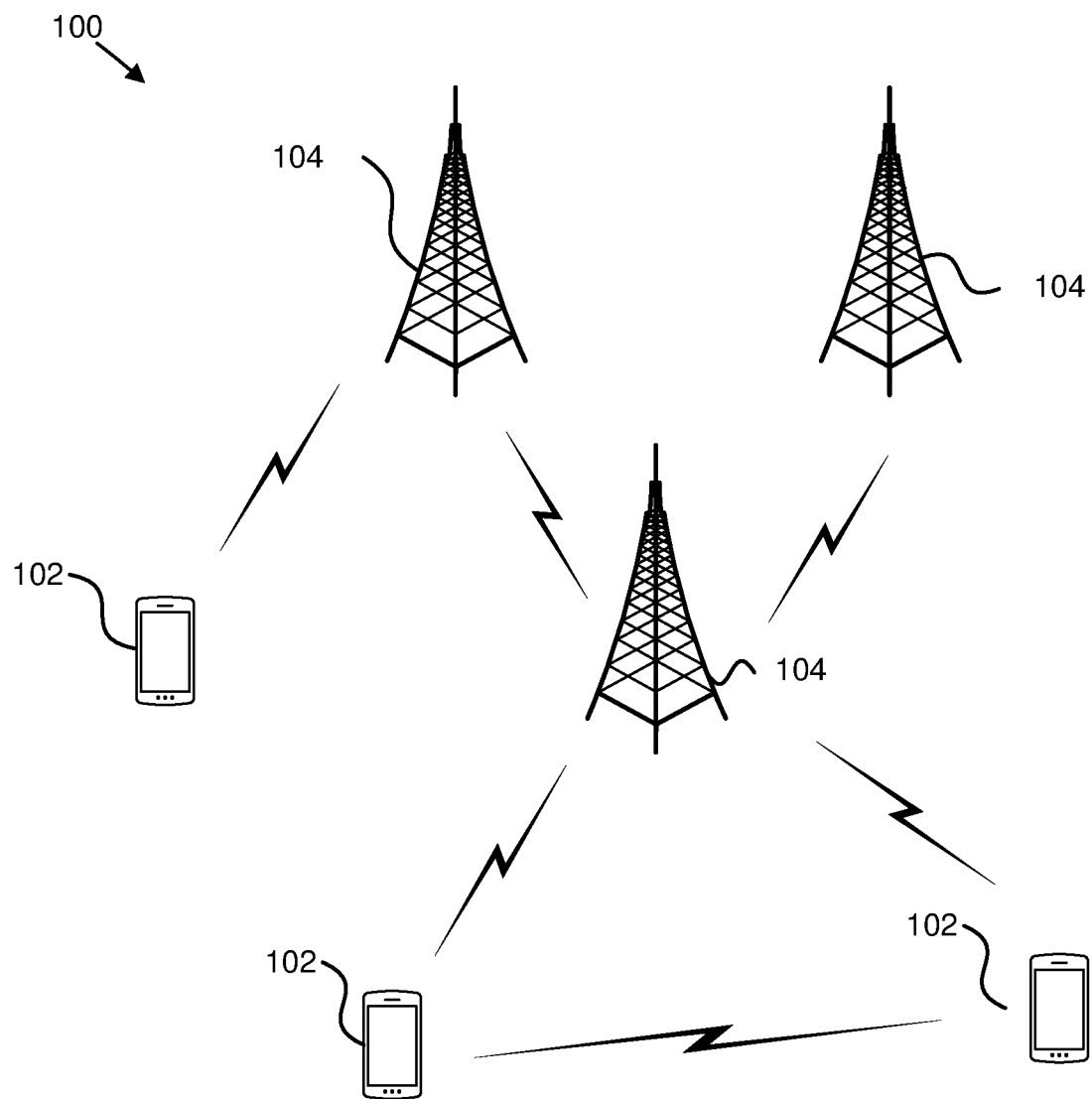
FIG. 1 is a schematic block diagram illustrating one embodiment of a wireless communication system for configuring repeater-assisted communication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring repeater-assisted communication. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may transmit, from a first network node, an indication of repeater-assisted communication to a second network node and a third network node. In some embodiments, the network unit 104 may transmit configuration information to the second network node and the third network node. The configuration information includes control information that corresponds to whether the second network node and the third network node are turned on or turned off, the control information corresponding to whether the second network node and the third network node are turned on or turned off is correlated, the control information identifies timing information for the second network node and the third network node, and the timing information indicates whether the second network node and the third network node are expected to transmit a signal received at the second network node and the third network node at a prior time to the first network node, a fourth network node, or a combination thereof based on the configuration information. Accordingly, the network unit 104 may be used for configuring repeater-assisted communication.

In certain embodiments, a network unit 104 may receive, at a repeater network node, an indication of repeater-assisted communication. In some embodiments, the network unit 104 may receive configuration information. The configuration information includes control information that corresponds to whether a first repeater node and a second repeater node are turned on or turned off are correlated, the control information identifies timing information for the second network node and the third network node, and the timing information indicates whether the second network node and the third network node are expected to transmit a signal received at the second network node and the third network node at a prior time to the a network node, a fourth network node, or a combination thereof based on the configuration information. Accordingly, the network unit 104 may be used for configuring repeater-assisted communication.

Figure 2:
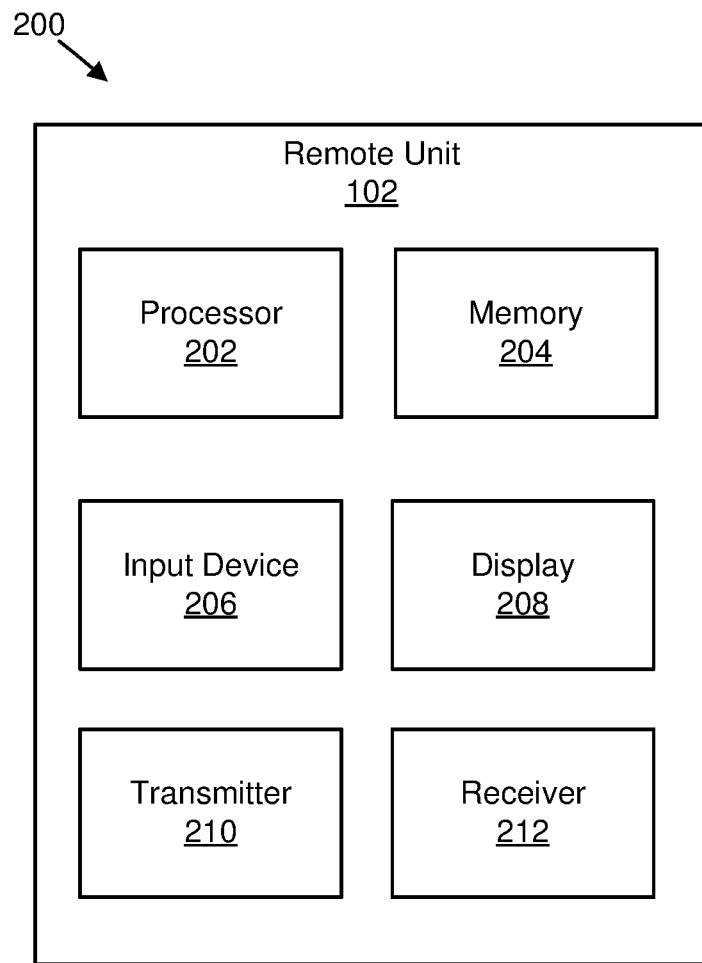
FIG. 2 is a schematic block diagram illustrating one embodiment of an apparatus that may be used for configuring repeater-assisted communication.

FIG. 2 depicts one embodiment of an apparatus 200 that may be used for configuring repeater-assisted communication. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
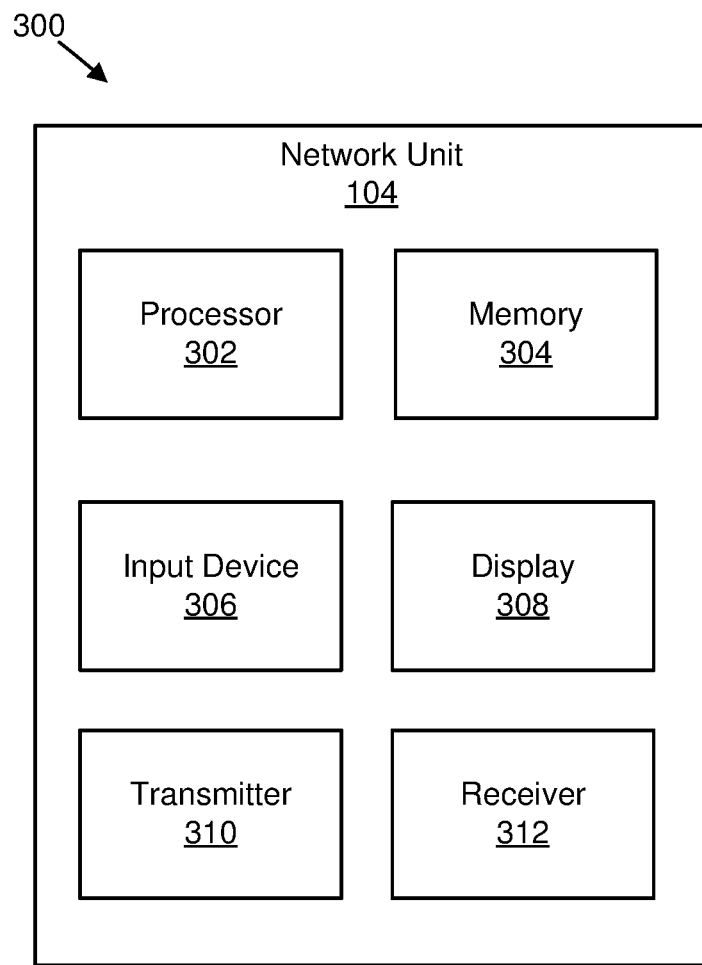
FIG. 3 is a schematic block diagram illustrating one embodiment of an apparatus that may be used for configuring repeater-assisted communication.

FIG. 3 depicts one embodiment of an apparatus 300 that may be used for configuring repeater-assisted communication. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits an indication of repeater-assisted communication to a second network node and a third network node; and transmits configuration information to the second network node and the third network node. The configuration information includes control information that corresponds to whether a second network node and a third network node are turned on or turned off are correlated, the control information identifies timing information for the second network node and the third network node, and the timing information indicates whether the second network node and the third network node are expected to transmit a signal received at the second network node and the third network node at a prior time to the first network node, a fourth network node, or a combination thereof based on the configuration information.

In some embodiments, the receiver 312: receives an indication of repeater-assisted communication; and receives configuration information. The configuration information includes control information that corresponds to whether a first repeater node and a second repeater node are turned on or turned off are correlated, the control information identifies timing information for the second network node and the third network node, and the timing information indicates whether the second network node and the third network node are expected to transmit a signal received at the second network node and the third network node at a prior time to the a network node, a fourth network node, or a combination thereof based on the configuration information.

In certain embodiments, fifth generation ("5G") new radio ("NR") extends network coverage for both uplink and downlink communication. In such embodiments, the network may be densified by implementing additional network transceiver nodes; however, the cost of sensifying a network may be large. Moreover, in such embodiments, integrated access and backhaul ("TAB") nodes may be used to assist the network with improving performance; however, this may also require a large cost. In some embodiments, repeater nodes may be used (e.g., referred to herein as "repeaters") to help densify a network. The repeater, with the help of side control information (e.g., timing information, time division duplexing ("TDD") uplink ("UL") and/or downlink ("DL") configuration, on signaling and/or off signaling ("on/off signaling", "ON/OFF"), spatial beamforming, transmission configuration indicator ("TCI") state, spatial transmit ("TX") and/or receive ("RX") relation information, and so forth) from the network, forwards signals received from a network node (e.g., in DL communication) to one or more devices (e.g., user equipments ("UEs") and/or another repeater) in its communication range, or forwards signals received from one or more devices (e.g., UEs in UL communication) in a radio frequency without the need for baseband processing of a device's user plane data (e.g., physical downlink shared channel ("PDSCH") and/or physical uplink shared channel ("PUSCH")) channels and/or signals transmitted via either uplink or downlink. It should be noted that a repeater may be considered a "smart repeater" if the repeater can pursue one of the following processes: adaptive beamforming, decoding control and/or reference signal configuration information from a network node, or transmitting control and/or reference signals to UE nodes.

In various embodiments, there may be multiple approaches corresponding to a system wherein multiple repeaters are configured by a same cell, such as: 1) an enhanced framework for ON/OFF control signaling configuration for repeaters is used assuming an existence of multiple repeaters per cell—repeaters within a cell are turned ON/OFF in an alternating manner; 2) a joint transmission approach from two repeaters may be configured within the same cell that either improves throughput (e.g., via joint transmission) and/or diversity (e.g., via time domain multiplexing ("TDM") and/or frequency division multiplexing ("FDM") transmission); and/or 3) interference management in a cell including multiple repeaters, wherein the ON/OFF control information is coordinated such that no two repeaters that have a strong channel gain for the same UE can be activated simultaneously. It should be noted that, in some embodiments, a combination of one or more elements different embodiments described herein may be made.

In certain embodiments described herein, the following may be assumed: 1) a transmission and reception point ("TRP") may include TRPs, cells, nodes, panels, communication (e.g., signals and/or channels) associated with a control resource set ("CORESET") pool, and/or communication associated with a TCI state from a transmission configuration comprising at least two TCI states; 2) the term "repeater" may include a smart repeater, a relay, an IAB node, an intermediate node, and/or a reflecting surface; and/or 3) a UE is triggered or scheduled with one or more downlink control information ("DCI") transmissions, wherein a multi-TRP scheme may be based on spatial division multiplexing ("SDM") (e.g., scheme 1a), FDM (e.g., schemes 2a and/or 2b), and/or TDM (e.g., schemes 3 and/or 4). It should be noted that other transmission schemes than those described above are not precluded. Various embodiments are described herein. It should be noted that, one or more elements or features from one or more embodiments herein may be combined.

In a first set of embodiments, there may be an indication of repeater-assisted communication.

In a first embodiment of the first set of embodiments, repeater-assisted communication ("RAC") may be indicated via configuring a UE with two CORESET pool indices, wherein a CORESET (e.g., ControlResourceSet) may have a CORESET pool index (e.g., CORESETPoolIndex) indicating one of two CORESET pool indices values, and two physical downlink control channels ("PDCCHs") for the UE (e.g., with cyclic redundancy check ("CRC") scrambled with UE-specific radio network temporary identifier ("RNTI")) in search spaces in the two CORESETs with different CORESET pool index values scheduling a same PDSCH (e.g., same or repetition of PDSCH scheduling assignment in each of the PDCCHs). The two PDCCHs or the two search spaces in the two CORESETS with different CORESET pool index values may be linked (e.g., in the case of PDCCH repetition), wherein a first of the two CORESET pool indexes corresponds to a TRP, and the second of the two CORESET pool index corresponds to a repeater.

In a second embodiment of the first set of embodiments, RAC is indicated via configuring the UE with a TCI codepoint corresponding to two TCI states, wherein a first TCI state corresponds to a TRP network node and a second TCI state corresponds to a repeater. In one example, a reference signal transmitted from a TRP cannot be quasi-co-located ("QCLed") with that transmitted from a repeater according to QCL Type-D, wherein QCL Type-D depicts spatial relation quasi-co-location ("QCL") information.

In a third embodiment of the first set of embodiments, RAC is indicated via configuring a UE with a repetition scheme configuration (e.g., RepetitionSchemeConfig) under either a PDSCH transmission configuration (e.g., PDSCH-Config), a PDCCH transmission configuration (e.g., PDCCH-Config), a PUSCH transmission configuration (e.g., PUSCH-Config), or a PUCCH transmission configuration (e.g., PUCCH-Config). In one example, a scheme (e.g., SDM-Scheme) is used as a new repetition scheme for RAC.

In a fourth embodiment of the first set of embodiments, RAC is indicated via configuring a UE within a control information channel or signal (e.g., PDCCH DCI) with a special format, wherein the control information channel indicates a set of one or more slots, a set of one or more physical resource blocks ("PRBs"), a set of one or more bandwidth parts ("BWPs"), or a combination thereof. In a first example, a DCI format class (e.g., DCI format 4_x) that is dedicated for PDSCH, PDCCH, PUSCH, and/or physical uplink control channel ("PUCCH") repetition with the RAC. In a second example, a DCI format for other purposes (e.g., DCI format 2_7) is provided (e.g., which can indicate) to the repeater and/or side control information (e.g., at least one of timing information, TDD UL and/or DL configuration, on/off signaling, DL and/or UL TX power, spatial beam-forming, TCI-state, spatial TX and/or RX relation information, and so forth) for one or more repeaters (e.g., different position in DCI fields may be configured for different repeaters indicating a position (e.g., starting, bit) of the side control information for the indicated repeater within the DCI payload). In another example, a DCI format 2_7 is scrambled with a repeater ID; thus, the repeater needs to apply a DCI search using this ID among different control channel element ("CCE") offsets corresponding to configured repeaters.

In a second set of embodiments, there may be an ON/OFF repeater configuration. In such embodiments, an enhanced framework for ON/OFF control signaling configuration for repeaters is used assuming an existence of multiple repeaters per cell, wherein repeaters within a cell are configured with ON/OFF in an alternating manner. Moreover, in such embodiments, there may be a network with two repeaters, with the objective of turning ON no more than one repeater at a time (e.g., a UE served by the best of two repeaters), whereas the other repeater should be switched off to avoid power loss and avoid inter-cell interference on other UEs close to the other repeater.

Figure 4:
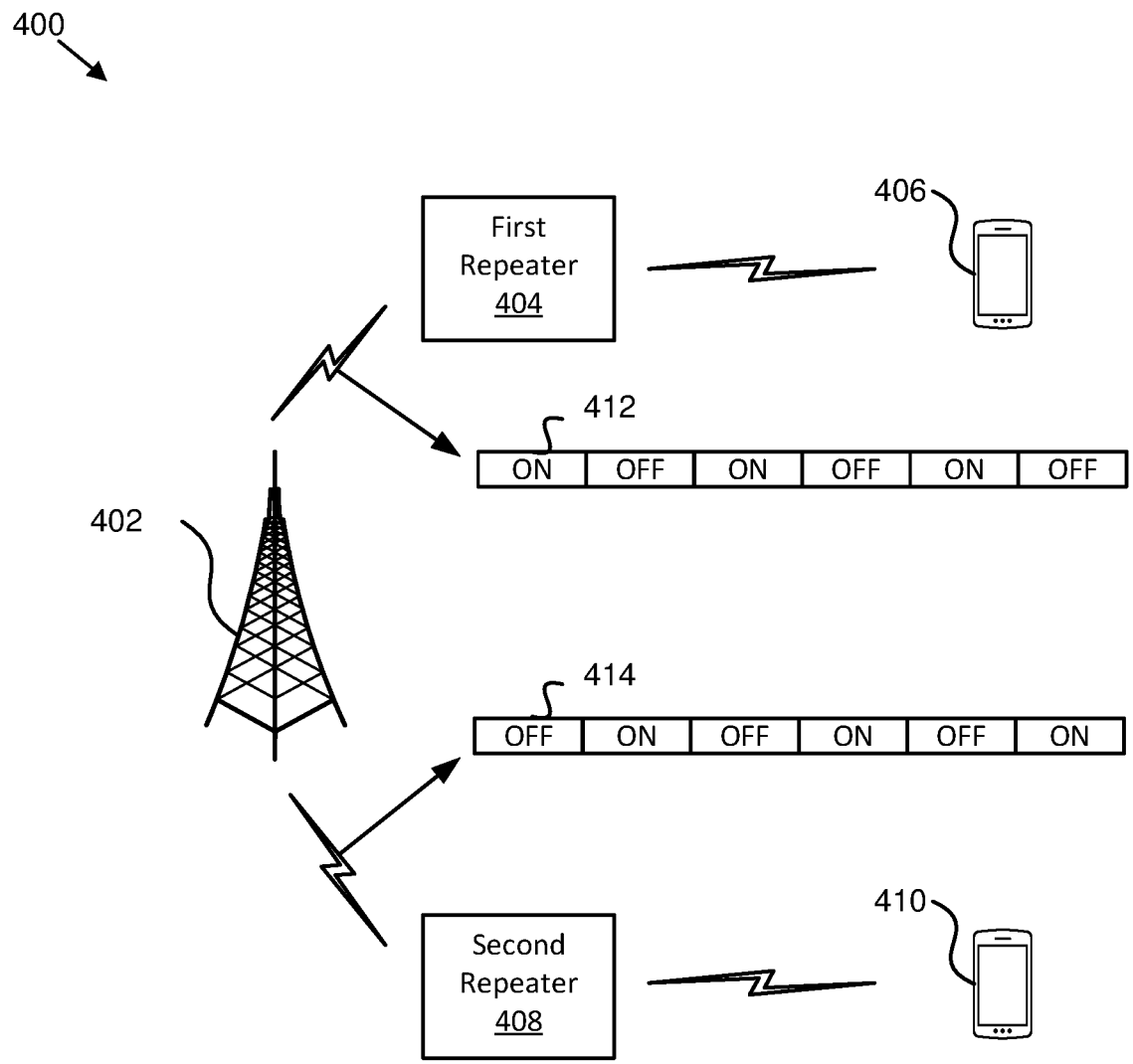
FIG. 4 is a schematic block diagram illustrating one embodiment of a system having two repeaters switched ON/OFF in an alternating fashion.

FIG. 4 is a schematic block diagram illustrating one embodiment of a system 400 having two repeaters switched ON/OFF in an alternating fashion. The system 400 includes a network unit 402 (e.g., gNB), a first repeater 404 that communicates with a first remote unit 406 (e.g., UE), and a second repeater 408 that communicates with a second remote unit 410 (e.g., UE). A first ON/OFF pattern 412 is signaled to the first repeater 404, and a second ON/OFF pattern 414 is signaled to the second repeater 408 so that only one repeater is turned ON at a time. Several embodiments are described herein based on the system 400 in FIG. 4. It should be noted that, a combination of one or more elements of the embodiments described herein may be considered as combined embodiments.

In a first embodiment of the second set of embodiments, a network including K repeaters configures repeater k, where $k \in \{1, 2, \ldots, K\}$ with ON/OFF information configured via side control information. The repeater k is configured to be turned on/off in an alternating manner (e.g., any two repeaters within a cell are turned ON over non-overlapping time slots). In one example, repeater k is turned on for a duration of x consecutive symbols every y slots, wherein x, and y are positive integer values. In such an example, assume the following numerical example, wherein K=6, x=10, and y=100. Under this example, Repeater 1 is turned on for slots {[0,9], [100,109], [200,209], ...}; Repeater 2 is turned on for slots {[10,19], [110,119], [210,219], ...}; Repeater 3 is turned on for slots {[20,29], [120,129], [220,229], ...}; Repeater 4 is turned on for slots {[30,39], [130,139], [230,239], ...}; Repeater 5 is turned on for slots {[40,49], [140,149], [240,249], ...}; and/or Repeater 6 is turned on for slots {[50,59], [150,159], [250,259], ...}.

In a second embodiment of the second set of embodiments, a repeater is assigned a repeater identifier ("ID") as part of repeater control information configuring the repeater, wherein a Repeater k is turned on for intervals [δy+(k−1)x, δy+kx−1], wherein k corresponds to the repeater ID, x represents a number of consecutive slots in which a repeater k is turned on, y represents the periodicity of turning ON the Repeater k (e.g., a time interval between the first slot of two consecutive turning ON of the repeater, and δ=0, 1, 2, 3, ...). It should be noted that the values k, x, and y are either higher-layer configured or indicated as part of the repeater control information, or some combination thereof.

In a third embodiment of the second set of embodiments, ON/OFF configuration information may be conveyed to a repeater in a form of control information. In one example, the control information is in a form of a DCI format (e.g., a new DCI format, DCI format 4).

In a fourth embodiment of the second set of embodiments, ON/OFF configuration information is conveyed to a repeater in a form of higher-layer configuration information.

In a fifth embodiment of the second set of embodiments, ON/OFF configuration information conveyed to a repeater is associated with a time-domain behavior. The time-domain behavior of the ON/OFF configuration may be set to either periodic, aperiodic, or semi-persistent.

In a sixth embodiment of the second set of embodiments, a repeater is configured with discontinuous reception ("DRX") and/or connected mode discontinuous reception ("CDRX"). Moreover, the repeater is configured with a DRX cycle, an on duration timer, and/or a DRX inactivity timer.

One example that illustrates a combination of a subset of embodiments described herein is as follows: 1) step 1: a network pre-configures two repeaters in the same cell with a repeater ID (e.g., Repeater 0 and Repeater 1); 2) step 2: the network sends a common configuration to both repeaters to switch ON at time unit 2r+k, where k represents a repeater ID (k=0 or 1), and r=0, 1, 2, ... (e.g., Repeater 0 is turned on at even time frames and Repeater 1 is turned on at odd time frames—a unified ON/OFF configuration formula for both repeaters—in other words, the network configures repeaters with periodic and/or semi-persistent ON/OFF switching in an alternating fashion; 3) step 3: Repeater 0 forwards signals received at even time frames (e.g., while Repeater 1 is turned off) and Repeater 1 forwards signals received at odd time frames (e.g., while Repeater 0 is turned off).

A third set of embodiments may include configuring a UE with transmission to and/or reception from multiple repeaters. In such embodiments, a joint transmission approach from two repeaters configured within the same cell is used that either improves throughput (e.g., via joint transmission) and/or diversity (e.g., via TDM and/or FDM transmission). For instance, under non-coherent joint transmission with two repeaters configured within the same cell, the two repeaters may jointly communicate with one UE to transmit two sets of layers corresponding to at least one codeword.

Figure 5:
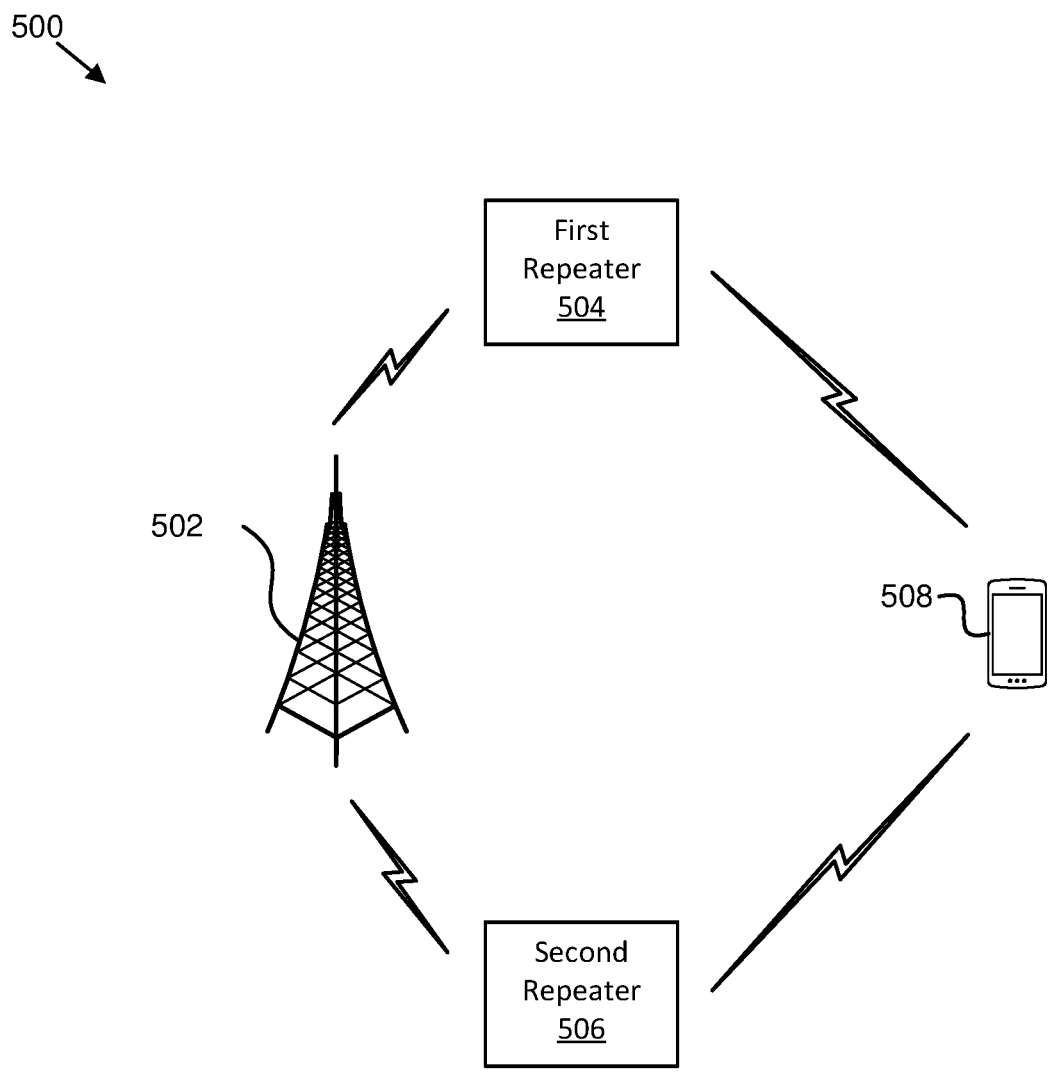
FIG. 5 is a schematic block diagram illustrating one embodiment of a system having two repeaters switched ON simultaneously to serve one UE.

FIG. 5 is a schematic block diagram illustrating one embodiment of a system 500 having two repeaters switched ON simultaneously to serve one UE. The system 500 includes a network unit 502 (e.g., gNB), a first repeater 504, a second repeater 506, and a remote unit (e.g., UE) 508. Several embodiments are provided herein based on FIG. 5. It should be noted that, a combination of one or more elements of the embodiments described herein may be considered as combined embodiments.

In a first embodiment of the third set of embodiments, a network configures two repeaters within a same cell for forwarding signals to a same UE. The signals correspond to two sets of PDSCH layers forwarded via the two repeaters, and CSI-RS symbols corresponding to two CSI-RS resources are forwarded via the two repeaters.

In a second embodiment of the third set of embodiments, two repeaters are configured to be turned ON simultaneously. The ON/OFF configuration timing for the two repeaters is the same. In one example, the two repeaters receive a common ON/OFF configuration information pattern.

In a third embodiment of the third set of embodiments, a UE configured with transmission and/or reception to and/or from multiple repeaters is expected to be configured with a TCI codepoint corresponding to two TCI states corresponding to demodulation reference signals ("DMRSs") for PDSCH transmissions from different code division multiplexing ("CDM") groups.

In a fourth embodiment of the third set of embodiments, a UE configured with transmission and/or reception to and/or from multiple repeaters is expected to be configured with a repetition scheme configuration corresponding to an FDM scheme or a TDM scheme in a PDSCH configuration, a PDCCH configuration, a PUSCH configuration, and/or a PUCCH configuration.

In a fifth embodiment of the third set of embodiments, a UE configured with transmission and/or reception to and/or from multiple repeaters is expected to be configured with a CSI reporting configuration corresponding to a multi-TRP transmission scheme. A CSI-RS resource set for channel measurement associated with the CSI reporting configuration is configured with two resource groups and N resource pairs.

In a sixth embodiment of the third set of embodiments, a UE configured with reception from multiple repeaters is expected to feed back an indication to a network on a preference of a hypothesis from a set of multiple hypotheses. The set of multiple hypotheses corresponds to a single-point transmission via one repeater corresponding to a single CSI-RS resource from one resource group, or joint transmission from two repeaters corresponding to a CSI-RS resource pair from the two resource groups. The indication may be in a form of a CSI-RS resource ID.

In a seventh embodiment of the third set of embodiments, if a network configures two repeaters within a same cell for forwarding signals to a same UE, and if the UE is configured with a single-frequency network ("SFN") scheme for PDSCH, the two repeaters are expected to be configured with a same ON/OFF configuration information, and the two repeaters are configured with different CSI-RS resources configured with tracking reference signal ("TRS") information. One example that illustrates a combination of a subset of embodiments described herein may include: 1) step 1: a network configures two repeaters with a same ON switching time for joint transmission; 2) a step 2: the network configures a UE with a TCI codepoint corresponding to 2 TCI states (e.g., corresponding to two repeaters), and a CSI reporting configuration corresponding to multi-TRP transmission (e.g., 2 CSI-RS resource groups); 3) step 3: the UE reports CSI indicating a best hypothesis (e.g., corresponding to either (i) Repeater 0 only, (ii) Repeater 1 only, or (iii) Joint transmission from both repeaters, e.g., via reporting a CSI-RS resource ID codepoint that corresponds to one repeater only (in case of a single-point transmission hypothesis) or a CSI-RS resource ID codepoint that corresponds to two repeaters (in case of multi-point/joint transmission hypothesis); and/or 4) step 4: the network configures Repeater 0 and/or Repeater 1 simultaneously for transmission to the UE based on a reported CSI indication.

In a fourth set of embodiments, there may be interference avoidance with multiple repeaters turned ON. In such embodiments, interference management in a cell may include multiple repeaters. ON/OFF control information is coordinated such that no two repeaters who have a strong channel gain to a same UE can be activated simultaneously. It should be noted that adding more repeaters to a cell may have a detrimental impact on network performance since the additional repeaters may increase inter-cell interference on out-of-cell UEs. For instance, instead of turning ON/OFF repeaters in a TDM fashion, if the selected TX beams corresponding to transmission from a network node to the two repeaters would lead to negligible mutual interference, then both repeaters may be turned on simultaneously; otherwise, both repeaters cannot be turned on simultaneously.

Figure 6:
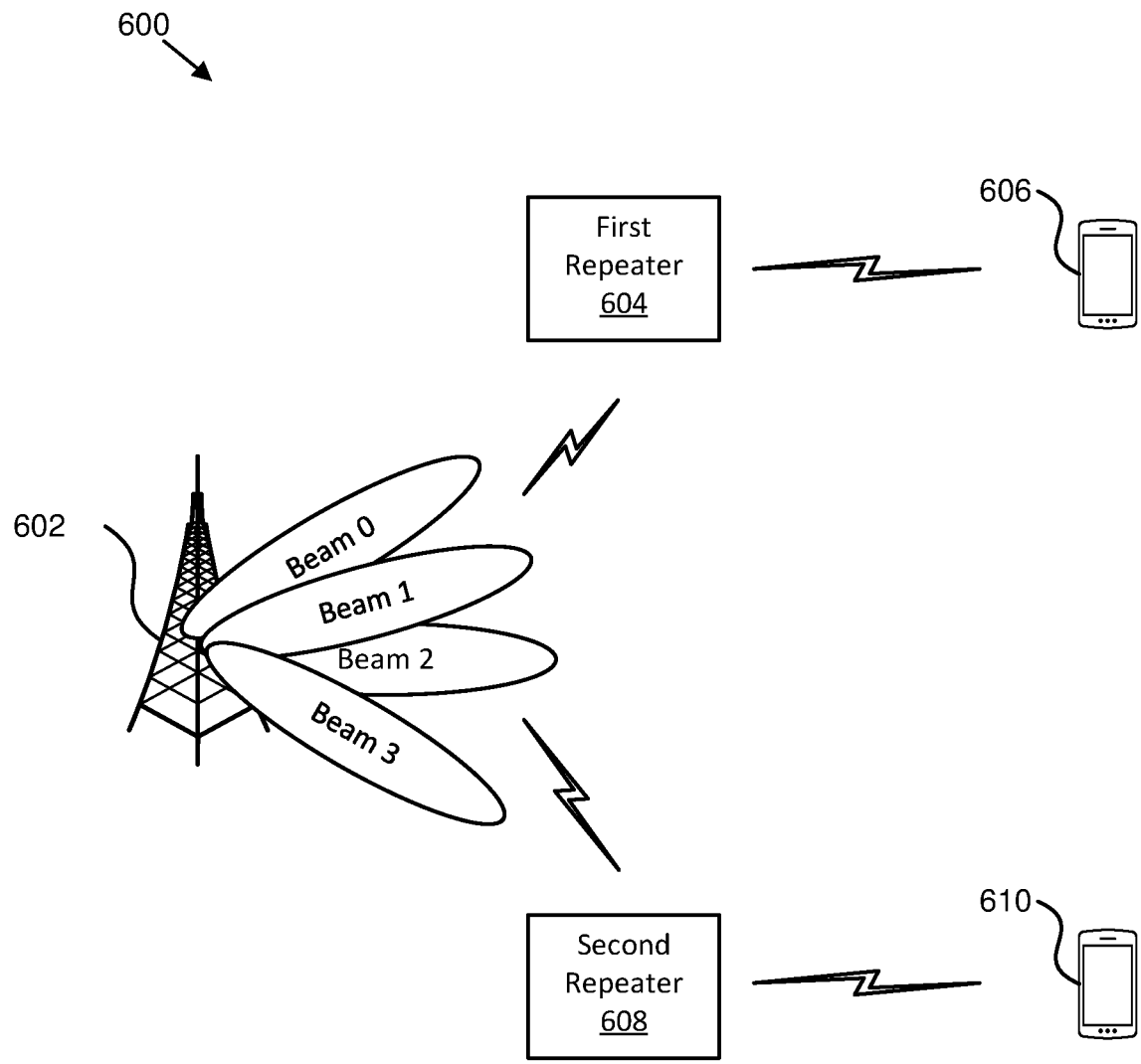
FIG. 6 is a schematic block diagram illustrating one embodiment of a system having two repeaters switched ON/OFF based on a TX beam.

FIG. 6 is a schematic block diagram illustrating one embodiment of a system 600 having two repeaters switched ON/OFF based on a TX beam of the network node. The system 600 includes a network unit 602 (e.g., gNB), a first repeater 604 that communicates with a first remote unit 606 (e.g., UE), and a second repeater 608 that communicates with a second remote unit 610 (e.g., UE). Multiple beams may be transmitted and/or used by the network unit 602 (e.g., beam 0, beam 1, beam 2, beam 3). Several embodiments are described herein based on the system 600 in FIG. 6. It should be noted that, a combination of one or more elements of the embodiments described herein may be considered as combined embodiments.

In a first embodiment of the fourth set of embodiments, if two repeaters configured within a same cell are turned ON over partially overlapping time slots or fully overlapping time slots, the signals forwarded by the two repeaters are expected to include different CSI-RS resources. In one example, a first of two repeaters within a same cell forwards a signal including a first of two CSI-RS resources, and a second of the two repeaters within the same cell forwards a signal comprising a second of the two CSI-RS resources.

In a second embodiment of the fourth set of embodiments, two repeaters configured within a same cell whose maximum layer 1 ("L1") signal-to-interference and noise ratio ("SINR") ("L1-SINR") and/or L1 reference signal received power ("RSRP") ("L1-RSRP") and/or reported channel state information ("CSI") reference signal ("RS") ("CSI-RS") resource index ("CRI") correspond to a same beam (e.g., CSI-RS resource) cannot be configured with ON over overlapping slots (e.g., whether the overlapping slots are fully overlapping slots or partially overlapping slots) assuming a gNB in the cell is equipped with one panel (e.g., a UE or a repeater configured with this cell cannot have a TCI codepoint corresponding to two TCI states corresponding to QCL Type-D).

In a third embodiment of the fourth set of embodiments, two repeaters configured within a same cell report a CRI codepoint per repeater. In the third embodiment, each CRI corresponds to a group of two or more CSI-RS resources, and, if any of the CSI-RS resources in the group of CSI-RS resources corresponding to a first of the two CRI codepoints are indicated within the group of CSI-RS resources corresponding to a second of the two CRI codepoints, the two repeaters cannot be configured with ON over overlapping slots e.g., whether the overlapping slots are fully overlapping slots or partially overlapping slots) assuming a gNB in the cell is equipped with one panel (e.g., a UE or a repeater configured with this cell cannot have a TCI codepoint corresponding to two TCI states corresponding to QCL Type-D).

In a fourth embodiment of the fourth set of embodiments, a repeater reports control information to the network based on network-based configuration information transmitted to the repeater that comprises at least one CRI codepoint. The repeater-generated control information may be in a form of a DMRS-less sequence (e.g., no DMRS symbols are associated with the reporter-generated control information). One example that illustrates a combination of a subset of embodiments described herein may include: 1) step 1: a network configures two repeaters with a set of 4 beams corresponding to configured CSI-RS resources; 2) step 2: each repeater feeds back a CRI value corresponding to a best TX beam; 3) step 3: if the CRI value reported by both repeaters are not the same (e.g., both repeaters do not share the same TX beam), the network may switch ON both repeaters simultaneously; otherwise, the gNB cannot turn on both repeaters simultaneously; and/or 4) step 3' (e.g., alternate to step 3): the network may configure each repeater to report a set of the best n beams (e.g., CRI codepoint corresponds to n CSI-RS resource IDs) or report corresponding L1-RSRP. A first repeater cannot be configured with a beam corresponding to the set of best beams corresponding to a second repeater, or vice versa.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mm-Wave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/pr unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 7:
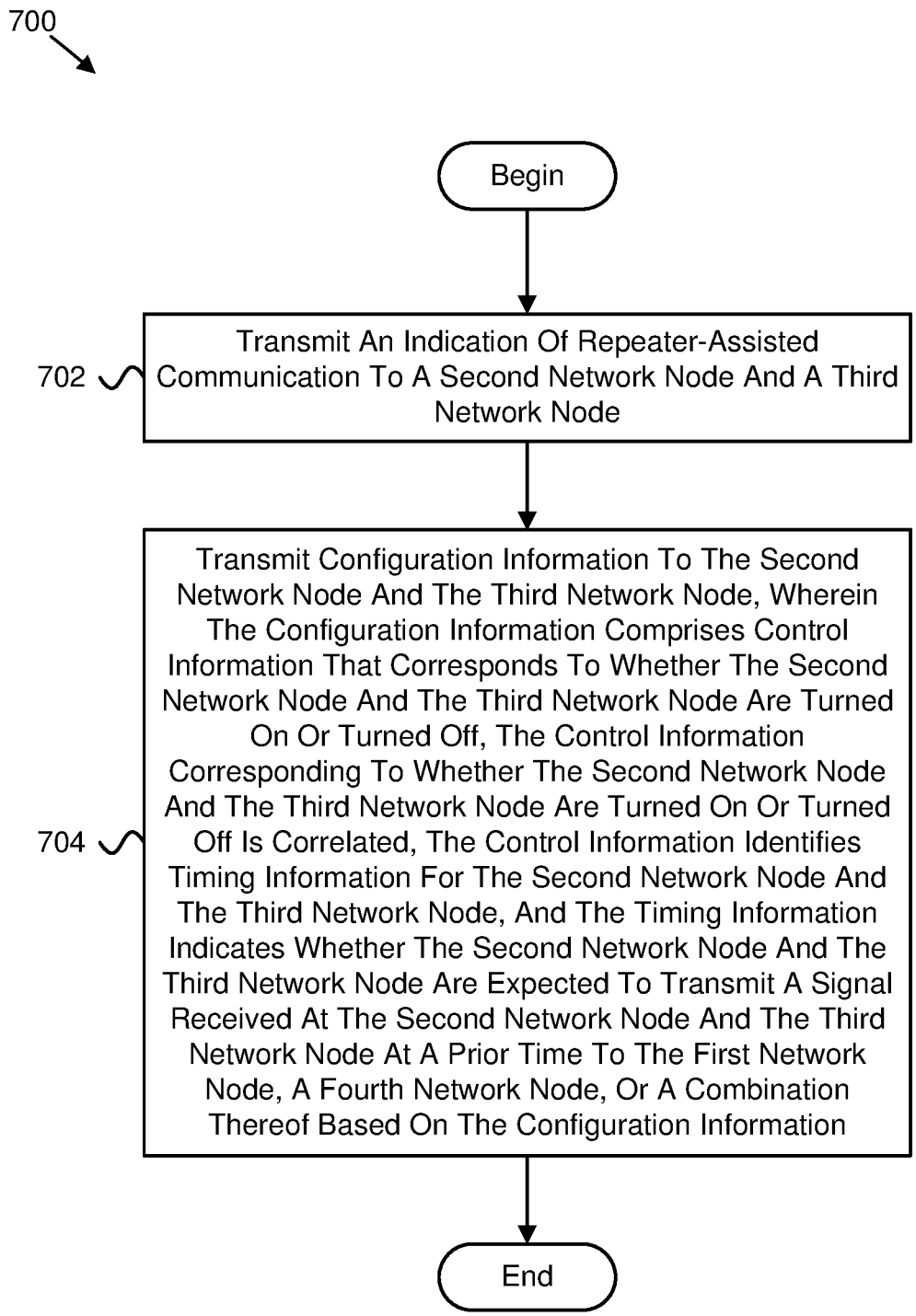
FIG. 7 is a flow chart diagram illustrating one embodiment of a method for configuring repeater-assisted communication.

FIG. 7 is a flow chart diagram illustrating one embodiment of a method 700 for configuring repeater-assisted communication. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes transmitting 702, from a first network node, an indication of repeater-assisted communication to a second network node and a third network node. In some embodiments, the method 700 includes transmitting 704 configuration information to the second network node and the third network node. The configuration information includes control information that corresponds to whether the second network node and the third network node are turned on or turned off, the control information corresponding to whether the second network node and the third network node are turned on or turned off is correlated, the control information identifies timing information for the second network node and the third network node, and the timing information indicates whether the second network node and the third network node are expected to transmit a signal received at the second network node and the third network node at a prior time to the first network node, a fourth network node, or a combination thereof based on the configuration information.

In certain embodiments, the first network node is a network transceiver, the second network node and the third network node are repeater nodes, and the fourth network node is a user equipment node. In some embodiments, the first network node is a network transceiver, the second network node and the third network node are user equipment nodes of a first type, and the fourth network node is a user equipment node of a second type.

In various embodiments, the indication of repeater-assisted communication is based on: downlink control information with a specified format, wherein the downlink control information comprises an indicator corresponding to whether the second network node, the third network node, or a combination thereof are turned on or turned off; a control information signal that corresponds to communication between a network node and a repeater node; a higher-layer parameter; a control information sequence that does not include symbols of a demodulation reference signal; or some combination thereof. In one embodiment, the correlation between the control information corresponding to the second network node and the control information corresponding to the third network node comprises the second network node and the third network node being configured with being turned ON in an alternating order, over non-overlapping time slots, or a combination thereof.

In certain embodiments, the alternating order is based on a repeater identification number, and each of the second network node and the third network node are configured with an identification number. In some embodiments, the control information is configured with a time-domain behavior set to a behavior selected from a group comprising: a periodic time-domain behavior with a configured periodicity, an aperiodic time-domain behavior, and a semi-persistent time-domain behavior.

In various embodiments, the second network node, the third network node, or a combination thereof are configured with discontinuous reception, connected mode discontinuous reception, or a combination thereof, the second network node, the third network node, or the combination thereof are further configured with a discontinuous reception cycle, an on-duration timer, a discontinuous reception inactivity timer, or some combination thereof. In one embodiment, the second network node and the third network node jointly communicate with the fourth network node to transmit two sets of layers to the fourth network node corresponding to at least one codeword.

In certain embodiments, the second network node and the third network node forward signals corresponding to two sets of physical downlink shared channel layers corresponding to the two repeaters, and channel state information reference signal symbols corresponding to two channel state information reference signal resources are forwarded via the second network node and the third network node. In some embodiments, the correlation between the control information corresponding to the second network node and the control information corresponding to the third network node comprises the second network node and the third network node being configured to be turned ON simultaneously, to be over overlapping time slots, with configuration timing for the second network node and the third network node being the same, or some combination thereof.

In various embodiments, the fourth network node is configured with multi-node transmission, reception, or a combination thereof corresponding to at least two nodes selected from a group comprising the first network node, the second network node, and the third network node, and is expected to be configured with a transmission configuration indication codepoint corresponding to two transmission configuration indication states corresponding to demodulation reference signals for a physical downlink shared channel from different code division multiplexing groups. In one embodiment, the fourth network node is configured with multi-node transmission, reception, or a combination thereof corresponding to at least two nodes selected from a group comprising the first network node, the second network node, and the third network node, and is expected to be configured with a repetition scheme configuration corresponding to a frequency division multiplexing scheme, or a time division multiplexing scheme in a physical downlink shared channel configuration, a physical downlink control channel configuration, a physical uplink shared channel configuration, a physical uplink control channel configuration, or some combination thereof.

In certain embodiments, the fourth network node is configured with multi-node transmission, reception, or a combination thereof corresponding to at least two nodes selected from a group comprising the first network node, the second network node, and the third network node, and wherein the fourth network node: is expected to be configured with a channel state information reporting configuration corresponding to a multi-transmission and reception point transmission scheme, wherein a channel state information reference signal resource set for channel measurement associated with the channel state information reporting configuration is configured with two resource groups and at least one resource pair; is expected to feed back an indication to the network indicating a preference of a hypothesis from a set of multiple hypotheses, the set of multiple hypotheses corresponds to a single-point transmission via one of the first network node, the second network node, and the third network node, corresponding to a single channel state information reference signal resource from one resource group, or joint transmission from at least two of the first network node, the second network node, and the third network node, corresponding to a channel state information reference signal resource pair from the two resource groups, and the indication is in a form of a channel state information reference signal resource identifier; or a combination thereof.

In some embodiments, in response to the second network node and the third network node being configured with a single frequency network scheme for a physical downlink shared channel, a physical downlink control channel, or a combination thereof, the second network node and the third network node are expected to be configured with the same control information, and the second network node and the third network node are configured with different channel state information reference signal resources configured with tracking reference signal information. In various embodiments, the second network node and the third network node feed back a channel state information reference signal resource indicator comprising a channel state information reference signal resource identifier, a layer-1 reference signal received power, a layer-1 signal to interference and noise ratio, or some combination thereof.

In one embodiment, the second network node and the third network node report a same channel state information reference signal resource identifier corresponding to a strongest beam corresponding to a maximum layer-one reference signal received power, a maximum layer-1 signal to interference and noise ratio, and wherein the second node and the third node are not expected to be configured to be turned ON over overlapping slots. In certain embodiments, at least one channel state information reference signal resource indicator corresponds to one or more channel state information reference signal resources, and wherein the second network node and the third network node are not expected to be configured to be turned ON over overlapping time slots if: the second network node is configured with a beam corresponding to a channel state information reference signal resource that is indicated within the channel state information reference signal resource indicator corresponding to the third network node; the third network node is configured with a beam corresponding to a channel state information reference signal resource that is indicated within the channel state information reference signal resource indicator corresponding to the second network node; or some combination thereof.

Figure 8:
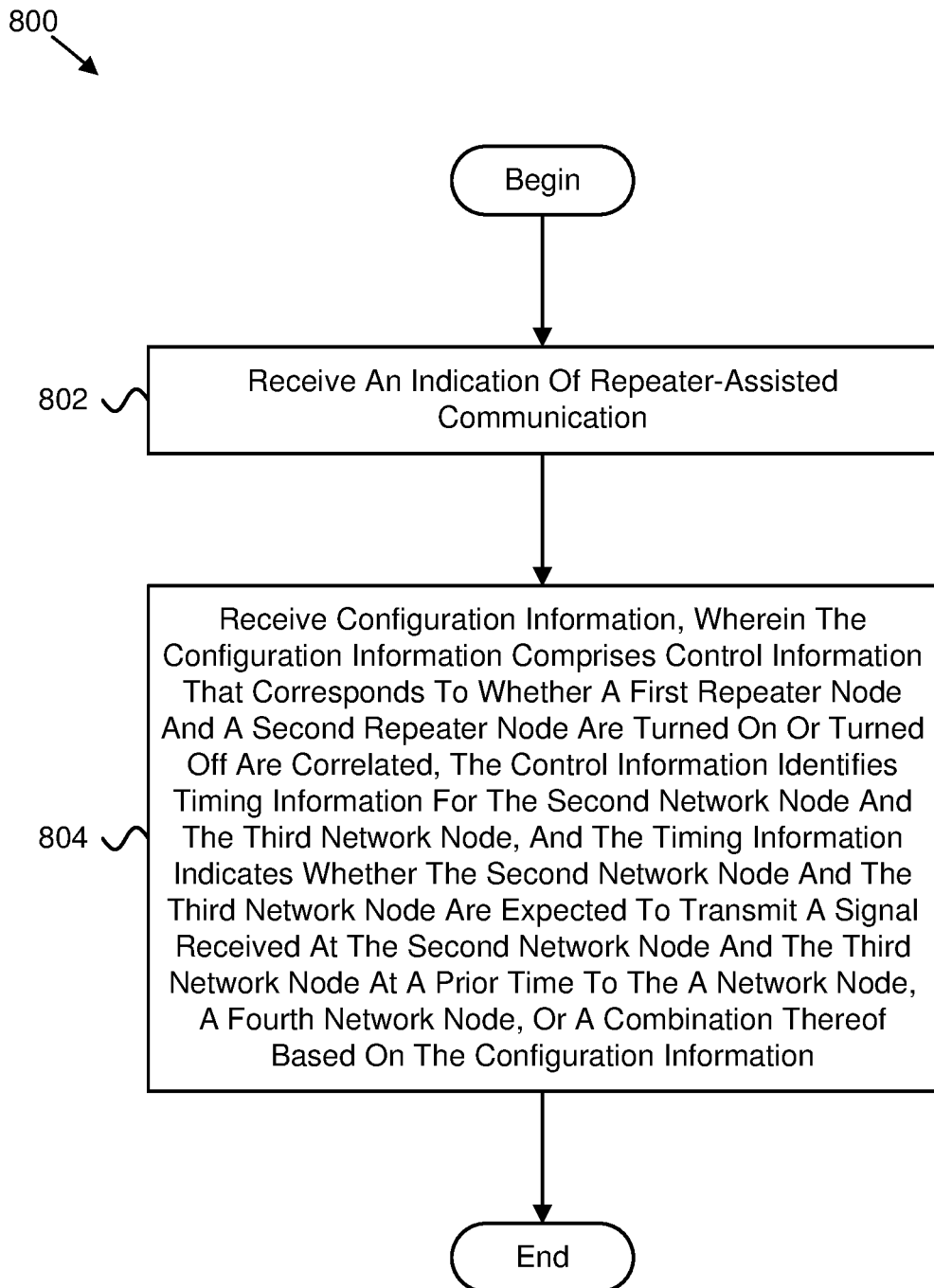
FIG. 8 is a flow chart diagram illustrating another embodiment of a method for configuring repeater-assisted communication.

FIG. 8 is a flow chart diagram illustrating another embodiment of a method 800 for configuring repeater-assisted communication. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

In various embodiments, the method 800 includes receiving 802, at a repeater network node, an indication of repeater-assisted communication. In some embodiments, the method 800 includes receiving 804 configuration information. The configuration information includes control information that corresponds to whether a first repeater node and a second repeater node are turned on or turned off are correlated, the control information identifies timing information for the second network node and the third network node, and the timing information indicates whether the second network node and the third network node are expected to transmit a signal received at the second network node and the third network node at a prior time to the a network node, a fourth network node, or a combination thereof based on the configuration information.

In certain embodiments, the first network node is a network transceiver, the second network node and the third network node are repeater nodes, and the fourth network node is a user equipment node. In some embodiments, the first network node is a network transceiver, the second network node and the third network node are user equipment nodes of a first type, and the fourth network node is a user equipment node of a second type.

In various embodiments, the indication of repeater-assisted communication is based on: downlink control information with a specified format, wherein the downlink control information comprises an indicator corresponding to whether the second network node, the third network node, or a combination thereof are turned on or turned off; a control information signal that corresponds to communication between a network node and a repeater node; a higher-layer parameter; a control information sequence that does not include symbols of a demodulation reference signal; or some combination thereof. In one embodiment, the correlation between the control information corresponding to the second network node and the control information corresponding to the third network node comprises the second network node and the third network node being configured with being turned ON in an alternating order, over non-overlapping time slots, or a combination thereof.

In certain embodiments, the alternating order is based on a repeater identification number, and each of the second network node and the third network node are configured with an identification number. In some embodiments, the control information is configured with a time-domain behavior set to a behavior selected from a group comprising: a periodic time-domain behavior with a configured periodicity, an aperiodic time-domain behavior, and a semi-persistent time-domain behavior.

In various embodiments, the second network node, the third network node, or a combination thereof are configured with discontinuous reception, connected mode discontinuous reception, or a combination thereof, the second network node, the third network node, or the combination thereof are further configured with a discontinuous reception cycle, an on-duration timer, a discontinuous reception inactivity timer, or some combination thereof. In one embodiment, the second network node and the third network node jointly communicate with the fourth network node to transmit two sets of layers to the fourth network node corresponding to at least one codeword.

In certain embodiments, the second network node and the third network node forward signals corresponding to two sets of physical downlink shared channel layers corresponding to the two repeaters, and channel state information reference signal symbols corresponding to two channel state information reference signal resources are forwarded via the second network node and the third network node. In some embodiments, the correlation between the control information corresponding to the second network node and the control information corresponding to the third network node comprises the second network node and the third network node being configured to be turned ON simultaneously, to be over overlapping time slots, with configuration timing for the second network node and the third network node being the same, or some combination thereof.

In various embodiments, the fourth network node is configured with multi-node transmission, reception, or a combination thereof corresponding to at least two nodes selected from a group comprising the first network node, the second network node, and the third network node, and is expected to be configured with a transmission configuration indication codepoint corresponding to two transmission configuration indication states corresponding to demodulation reference signals for a physical downlink shared channel from different code division multiplexing groups. In one embodiment, the fourth network node is configured with multi-node transmission, reception, or a combination thereof corresponding to at least two nodes selected from a group comprising the first network node, the second network node, and the third network node, and is expected to be configured with a repetition scheme configuration corresponding to a frequency division multiplexing scheme, or a time division multiplexing scheme in a physical downlink shared channel configuration, a physical downlink control channel configuration, a physical uplink shared channel configuration, a physical uplink control channel configuration, or some combination thereof.

In certain embodiments, the fourth network node is configured with multi-node transmission, reception, or a combination thereof corresponding to at least two nodes selected from a group comprising the first network node, the second network node, and the third network node, and wherein the fourth network node: is expected to be configured with a channel state information reporting configuration corresponding to a multi-transmission and reception point transmission scheme, wherein a channel state information reference signal resource set for channel measurement associated with the channel state information reporting configuration is configured with two resource groups and at least one resource pair; is expected to feed back an indication to the network indicating a preference of a hypothesis from a set of multiple hypotheses, the set of multiple hypotheses corresponds to a single-point transmission via one of the first network node, the second network node, and the third network node, corresponding to a single channel state information reference signal resource from one resource group, or joint transmission from at least two of the first network node, the second network node, and the third network node, corresponding to a channel state information reference signal resource pair from the two resource groups, and the indication is in a form of a channel state information reference signal resource identifier; or a combination thereof.

In some embodiments, in response to the second network node and the third network node being configured with a single frequency network scheme for a physical downlink shared channel, a physical downlink control channel, or a combination thereof, the second network node and the third network node are expected to be configured with the same control information, and the second network node and the third network node are configured with different channel state information reference signal resources configured with tracking reference signal information. In various embodiments, the second network node and the third network node feed back a channel state information reference signal resource indicator comprising a channel state information reference signal resource identifier, a layer-1 reference signal received power, a layer-1 signal to interference and noise ratio, or some combination thereof.

In one embodiment, the second network node and the third network node report a same corresponding to a maximum layer-one reference signal received power, a maximum layer-1 signal to interference and noise ratio, and wherein the second node and the third node are not expected to be configured to be turned ON over overlapping slots. In certain embodiments, at least one channel state information reference signal resource indicator corresponds to one or more channel state information reference signal resources, and wherein the second network node and the third network node are not expected to be configured to be turned ON over overlapping time slots if: the second network node is configured with a beam corresponding to a channel state information reference signal resource that is indicated within the channel state information reference signal resource indicator corresponding to the third network node; the third network node is configured with a beam corresponding to a channel state information reference signal resource that is indicated within the channel state information reference signal resource indicator corresponding to the second network node; or some combination thereof.

In one embodiment, a method of a first network node comprises: transmitting an indication of repeater-assisted communication to a second network node and a third network node; and transmitting configuration information to the second network node and the third network node, wherein the configuration information comprises control information that corresponds to whether the second network node and the third network node are turned on or turned off, the control information corresponding to whether the second network node and the third network node are turned on or turned off is correlated, the control information identifies timing information for the second network node and the third network node, and the timing information indicates whether the second network node and the third network node are expected to transmit a signal received at the second network node and the third network node at a prior time to the first network node, a fourth network node, or a combination thereof based on the configuration information.

In certain embodiments, the first network node is a network transceiver, the second network node and the third network node are repeater nodes, and the fourth network node is a user equipment node.

In some embodiments, the first network node is a network transceiver, the second network node and the third network node are user equipment nodes of a first type, and the fourth network node is a user equipment node of a second type.

In various embodiments, the indication of repeater-assisted communication is based on: downlink control information with a specified format, wherein the downlink control information comprises an indicator corresponding to whether the second network node, the third network node, or a combination thereof are turned on or turned off; a control information signal that corresponds to communication between a network node and a repeater node; a higher-layer parameter; a control information sequence that does not include symbols of a demodulation reference signal; or some combination thereof.

In one embodiment, the correlation between the control information corresponding to the second network node and the control information corresponding to the third network node comprises the second network node and the third network node being configured with being turned ON in an alternating order, over non-overlapping time slots, or a combination thereof.

In certain embodiments, the alternating order is based on a repeater identification number, and each of the second network node and the third network node are configured with an identification number.

In some embodiments, the control information is configured with a time-domain behavior set to a behavior selected from a group comprising: a periodic time-domain behavior with a configured periodicity, an aperiodic time-domain behavior, and a semi-persistent time-domain behavior.

In various embodiments, the second network node, the third network node, or a combination thereof are configured with discontinuous reception, connected mode discontinuous reception, or a combination thereof, the second network node, the third network node, or the combination thereof are further configured with a discontinuous reception cycle, an on-duration timer, a discontinuous reception inactivity timer, or some combination thereof.

In one embodiment, the second network node and the third network node jointly communicate with the fourth network node to transmit two sets of layers to the fourth network node corresponding to at least one codeword.

In certain embodiments, the second network node and the third network node forward signals corresponding to two sets of physical downlink shared channel layers corresponding to the two repeaters, and channel state information reference signal symbols corresponding to two channel state information reference signal resources are forwarded via the second network node and the third network node.

In some embodiments, the correlation between the control information corresponding to the second network node and the control information corresponding to the third network node comprises the second network node and the third network node being configured to be turned ON simultaneously, to be over overlapping time slots, with configuration timing for the second network node and the third network node being the same, or some combination thereof.

In various embodiments, the fourth network node is configured with multi-node transmission, reception, or a combination thereof corresponding to at least two nodes selected from a group comprising the first network node, the second network node, and the third network node, and is expected to be configured with a transmission configuration indication codepoint corresponding to two transmission configuration indication states corresponding to demodulation reference signals for a physical downlink shared channel from different code division multiplexing groups.

In one embodiment, the fourth network node is configured with multi-node transmission, reception, or a combination thereof corresponding to at least two nodes selected from a group comprising the first network node, the second network node, and the third network node, and is expected to be configured with a repetition scheme configuration corresponding to a frequency division multiplexing scheme, or a time division multiplexing scheme in a physical downlink shared channel configuration, a physical downlink control channel configuration, a physical uplink shared channel configuration, a physical uplink control channel configuration, or some combination thereof.

In certain embodiments, the fourth network node is configured with multi-node transmission, reception, or a combination thereof corresponding to at least two nodes selected from a group comprising the first network node, the second network node, and the third network node, and wherein the fourth network node: is expected to be configured with a channel state information reporting configuration corresponding to a multi-transmission and reception point transmission scheme, wherein a channel state information reference signal resource set for channel measurement associated with the channel state information reporting configuration is configured with two resource groups and at least one resource pair; is expected to feed back an indication to the network indicating a preference of a hypothesis from a set of multiple hypotheses, the set of multiple hypotheses corresponds to a single-point transmission via one of the first network node, the second network node, and the third network node, corresponding to a single channel state information reference signal resource from one resource group, or joint transmission from at least two of the first network node, the second network node, and the third network node, corresponding to a channel state information reference signal resource pair from the two resource groups, and the indication is in a form of a channel state information reference signal resource identifier; or a combination thereof.

In some embodiments, in response to the second network node and the third network node being configured with a single frequency network scheme for a physical downlink shared channel, a physical downlink control channel, or a combination thereof, the second network node and the third network node are expected to be configured with the same control information, and the second network node and the third network node are configured with different channel state information reference signal resources configured with tracking reference signal information.

In various embodiments, the second network node and the third network node feed back a channel state information reference signal resource indicator comprising a channel state information reference signal resource identifier, a layer-1 reference signal received power, a layer-1 signal to interference and noise ratio, or some combination thereof.

In one embodiment, the second network node and the third network node report a same channel state information reference signal resource identifier corresponding to a strongest beam corresponding to a maximum layer-one reference signal received power, a maximum layer-1 signal to interference and noise ratio, and wherein the second node and the third node are not expected to be configured to be turned ON over overlapping slots.

In certain embodiments, at least one channel state information reference signal resource indicator corresponds to one or more channel state information reference signal resources, and wherein the second network node and the third network node are not expected to be configured to be turned ON over overlapping time slots if: the second network node is configured with a beam corresponding to a channel state information reference signal resource that is indicated within the channel state information reference signal resource indicator corresponding to the third network node; the third network node is configured with a beam corresponding to a channel state information reference signal resource that is indicated within the channel state information reference signal resource indicator corresponding to the second network node; or some combination thereof.

In one embodiment, an apparatus comprises a first network node. The apparatus further comprises: a transmitter that: transmits an indication of repeater-assisted communication to a second network node and a third network node; and transmits configuration information to the second network node and the third network node, wherein the configuration information comprises control information that corresponds to whether a second network node and a third network node are turned on or turned off are correlated, the control information identifies timing information for the second network node and the third network node, and the timing information indicates whether the second network node and the third network node are expected to transmit a signal received at the second network node and the third network node at a prior time to the first network node, a fourth network node, or a combination thereof based on the configuration information.

In certain embodiments, the first network node is a network transceiver, the second network node and the third network node are repeater nodes, and the fourth network node is a user equipment node.

In some embodiments, the first network node is a network transceiver, the second network node and the third network node are user equipment nodes of a first type, and the fourth network node is a user equipment node of a second type.

In various embodiments, the indication of repeater-assisted communication is based on: downlink control information with a specified format, wherein the downlink control information comprises an indicator corresponding to whether the second network node, the third network node, or a combination thereof are turned on or turned off; a control information signal that corresponds to communication between a network node and a repeater node; a higher-layer parameter; a control information sequence that does not include symbols of a demodulation reference signal; or some combination thereof.

In one embodiment, the correlation between the control information corresponding to the second network node and the control information corresponding to the third network node comprises the second network node and the third network node being configured with being turned ON in an alternating order, over non-overlapping time slots, or a combination thereof.

In certain embodiments, the alternating order is based on a repeater identification number, and each of the second network node and the third network node are configured with an identification number.

In some embodiments, the control information is configured with a time-domain behavior set to a behavior selected from a group comprising: a periodic time-domain behavior with a configured periodicity, an aperiodic time-domain behavior, and a semi-persistent time-domain behavior.

In various embodiments, the second network node, the third network node, or a combination thereof are configured with discontinuous reception, connected mode discontinuous reception, or a combination thereof, the second network node, the third network node, or the combination thereof are further configured with a discontinuous reception cycle, an on-duration timer, a discontinuous reception inactivity timer, or some combination thereof.

In one embodiment, the second network node and the third network node jointly communicate with the fourth network node to transmit two sets of layers to the fourth network node corresponding to at least one codeword.

In certain embodiments, the second network node and the third network node forward signals corresponding to two sets of physical downlink shared channel layers corresponding to the two repeaters, and channel state information reference signal symbols corresponding to two channel state information reference signal resources are forwarded via the second network node and the third network node.

In some embodiments, the correlation between the control information corresponding to the second network node and the control information corresponding to the third network node comprises the second network node and the third network node being configured to be turned ON simultaneously, to be over overlapping time slots, with configuration timing for the second network node and the third network node being the same, or some combination thereof.

In various embodiments, the fourth network node is configured with multi-node transmission, reception, or a combination thereof corresponding to at least two nodes selected from a group comprising the first network node, the second network node, and the third network node, and is expected to be configured with a transmission configuration indication codepoint corresponding to two transmission configuration indication states corresponding to demodulation reference signals for a physical downlink shared channel from different code division multiplexing groups.

In one embodiment, the fourth network node is configured with multi-node transmission, reception, or a combination thereof corresponding to at least two nodes selected from a group comprising the first network node, the second network node, and the third network node, and is expected to be configured with a repetition scheme configuration corresponding to a frequency division multiplexing scheme, or a time division multiplexing scheme in a physical downlink shared channel configuration, a physical downlink control channel configuration, a physical uplink shared channel configuration, a physical uplink control channel configuration, or some combination thereof.

In certain embodiments, the fourth network node is configured with multi-node transmission, reception, or a combination thereof corresponding to at least two nodes selected from a group comprising the first network node, the second network node, and the third network node, and wherein the fourth network node: is expected to be configured with a channel state information reporting configuration corresponding to a multi-transmission and reception point transmission scheme, wherein a channel state information reference signal resource set for channel measurement associated with the channel state information reporting configuration is configured with two resource groups and at least one resource pair; is expected to feed back an indication to the network indicating a preference of a hypothesis from a set of multiple hypotheses, the set of multiple hypotheses corresponds to a single-point transmission via one of the first network node, the second network node, and the third network node, corresponding to a single channel state information reference signal resource from one resource group, or joint transmission from at least two of the first network node, the second network node, and the third network node, corresponding to a channel state information reference signal resource pair from the two resource groups, and the indication is in a form of a channel state information reference signal resource identifier; or a combination thereof.

In some embodiments, in response to the second network node and the third network node being configured with a single frequency network scheme for a physical downlink shared channel, a physical downlink control channel, or a combination thereof, the second network node and the third network node are expected to be configured with the same control information, and the second network node and the third network node are configured with different channel state information reference signal resources configured with tracking reference signal information.

In various embodiments, the second network node and the third network node feed back a channel state information reference signal resource indicator comprising a channel state information reference signal resource identifier, a layer-1 reference signal received power, a layer-1 signal to interference and noise ratio, or some combination thereof.

In one embodiment, the second network node and the third network node report a same corresponding to a maximum layer-one reference signal received power, a maximum layer-1 signal to interference and noise ratio, and wherein the second node and the third node are not expected to be configured to be turned ON over overlapping slots.

In certain embodiments, at least one channel state information reference signal resource indicator corresponds to one or more channel state information reference signal resources, and wherein the second network node and the third network node are not expected to be configured to be turned ON over overlapping time slots if: the second network node is configured with a beam corresponding to a channel state information reference signal resource that is indicated within the channel state information reference signal resource indicator corresponding to the third network node; the third network node is configured with a beam corresponding to a channel state information reference signal resource that is indicated within the channel state information reference signal resource indicator corresponding to the second network node; or some combination thereof.

In one embodiment, a method of a repeater network node comprises: receiving an indication of repeater-assisted communication; and receiving configuration information, wherein the configuration information comprises control information that corresponds to whether a first repeater node and a second repeater node are turned on or turned off are correlated, the control information identifies timing information for the second network node and the third network node, and the timing information indicates whether the second network node and the third network node are expected to transmit a signal received at the second network node and the third network node at a prior time to the a network node, a fourth network node, or a combination thereof based on the configuration information.

In certain embodiments, the first network node is a network transceiver, the second network node and the third network node are repeater nodes, and the fourth network node is a user equipment node.

In some embodiments, the first network node is a network transceiver, the second network node and the third network node are user equipment nodes of a first type, and the fourth network node is a user equipment node of a second type.

In various embodiments, the indication of repeater-assisted communication is based on: downlink control information with a specified format, wherein the downlink control information comprises an indicator corresponding to whether the second network node, the third network node, or a combination thereof are turned on or turned off; a control information signal that corresponds to communication between a network node and a repeater node; a higher-layer parameter; a control information sequence that does not include symbols of a demodulation reference signal; or some combination thereof.

In one embodiment, the correlation between the control information corresponding to the second network node and the control information corresponding to the third network node comprises the second network node and the third network node being configured with being turned ON in an alternating order, over non-overlapping time slots, or a combination thereof.

In certain embodiments, the alternating order is based on a repeater identification number, and each of the second network node and the third network node are configured with an identification number.

In some embodiments, the control information is configured with a time-domain behavior set to a behavior selected from a group comprising: a periodic time-domain behavior with a configured periodicity, an aperiodic time-domain behavior, and a semi-persistent time-domain behavior.

In various embodiments, the second network node, the third network node, or a combination thereof are configured with discontinuous reception, connected mode discontinuous reception, or a combination thereof, the second network node, the third network node, or the combination thereof are further configured with a discontinuous reception cycle, an on-duration timer, a discontinuous reception inactivity timer, or some combination thereof.

In one embodiment, the second network node and the third network node jointly communicate with the fourth network node to transmit two sets of layers to the fourth network node corresponding to at least one codeword.

In certain embodiments, the second network node and the third network node forward signals corresponding to two sets of physical downlink shared channel layers corresponding to the two repeaters, and channel state information reference signal symbols corresponding to two channel state information reference signal resources are forwarded via the second network node and the third network node.

In some embodiments, the correlation between the control information corresponding to the second network node and the control information corresponding to the third network node comprises the second network node and the third network node being configured to be turned ON simultaneously, to be over overlapping time slots, with configuration timing for the second network node and the third network node being the same, or some combination thereof.

In various embodiments, the fourth network node is configured with multi-node transmission, reception, or a combination thereof corresponding to at least two nodes selected from a group comprising the first network node, the second network node, and the third network node, and is expected to be configured with a transmission configuration indication codepoint corresponding to two transmission configuration indication states corresponding to demodulation reference signals for a physical downlink shared channel from different code division multiplexing groups.

In one embodiment, the fourth network node is configured with multi-node transmission, reception, or a combination thereof corresponding to at least two nodes selected from a group comprising the first network node, the second network node, and the third network node, and is expected to be configured with a repetition scheme configuration corresponding to a frequency division multiplexing scheme, or a time division multiplexing scheme in a physical downlink shared channel configuration, a physical downlink control channel configuration, a physical uplink shared channel configuration, a physical uplink control channel configuration, or some combination thereof.

In certain embodiments, the fourth network node is configured with multi-node transmission, reception, or a combination thereof corresponding to at least two nodes selected from a group comprising the first network node, the second network node, and the third network node, and wherein the fourth network node: is expected to be configured with a channel state information reporting configuration corresponding to a multi-transmission and reception point transmission scheme, wherein a channel state information reference signal resource set for channel measurement associated with the channel state information reporting configuration is configured with two resource groups and at least one resource pair; is expected to feed back an indication to the network indicating a preference of a hypothesis from a set of multiple hypotheses, the set of multiple hypotheses corresponds to a single-point transmission via one of the first network node, the second network node, and the third network node, corresponding to a single channel state information reference signal resource from one resource group, or joint transmission from at least two of the first network node, the second network node, and the third network node, corresponding to a channel state information reference signal resource pair from the two resource groups, and the indication is in a form of a channel state information reference signal resource identifier; or a combination thereof.

In some embodiments, in response to the second network node and the third network node being configured with a single frequency network scheme for a physical downlink shared channel, a physical downlink control channel, or a combination thereof, the second network node and the third network node are expected to be configured with the same control information, and the second network node and the third network node are configured with different channel state information reference signal resources configured with tracking reference signal information.

In various embodiments, the second network node and the third network node feed back a channel state information reference signal resource indicator comprising a channel state information reference signal resource identifier, a layer-1 reference signal received power, a layer-1 signal to interference and noise ratio, or some combination thereof.

In one embodiment, the second network node and the third network node report a same channel state information reference signal resource identifier corresponding to a strongest beam corresponding to a maximum layer-one reference signal received power, a maximum layer-1 signal to interference and noise ratio, and wherein the second node and the third node are not expected to be configured to be turned ON over overlapping slots.

In certain embodiments, at least one channel state information reference signal resource indicator corresponds to one or more channel state information reference signal resources, and wherein the second network node and the third network node are not expected to be configured to be turned ON over overlapping time slots if: the second network node is configured with a beam corresponding to a channel state information reference signal resource that is indicated within the channel state information reference signal resource indicator corresponding to the third network node; the third network node is configured with a beam corresponding to a channel state information reference signal resource that is indicated within the channel state information reference signal resource indicator corresponding to the second network node; or some combination thereof.

In one embodiment, an apparatus comprises a repeater network node. The apparatus further comprises: a receiver that: receives an indication of repeater-assisted communication; and receives configuration information, wherein the configuration information comprises control information that corresponds to whether a first repeater node and a second repeater node are turned on or turned off are correlated, the control information identifies timing information for the second network node and the third network node, and the timing information indicates whether the second network node and the third network node are expected to transmit a signal received at the second network node and the third network node at a prior time to the a network node, a fourth network node, or a combination thereof based on the configuration information.

In certain embodiments, the first network node is a network transceiver, the second network node and the third network node are repeater nodes, and the fourth network node is a user equipment node.

In some embodiments, the first network node is a network transceiver, the second network node and the third network node are user equipment nodes of a first type, and the fourth network node is a user equipment node of a second type.

In various embodiments, the indication of repeater-assisted communication is based on: downlink control information with a specified format, wherein the downlink control information comprises an indicator corresponding to whether the second network node, the third network node, or a combination thereof are turned on or turned off; a control information signal that corresponds to communication between a network node and a repeater node; a higher-layer parameter; a control information sequence that does not include symbols of a demodulation reference signal; or some combination thereof.

In one embodiment, the correlation between the control information corresponding to the second network node and the control information corresponding to the third network node comprises the second network node and the third network node being configured with being turned ON in an alternating order, over non-overlapping time slots, or a combination thereof.

In certain embodiments, the alternating order is based on a repeater identification number, and each of the second network node and the third network node are configured with an identification number.

In some embodiments, the control information is configured with a time-domain behavior set to a behavior selected from a group comprising: a periodic time-domain behavior with a configured periodicity, an aperiodic time-domain behavior, and a semi-persistent time-domain behavior.

In various embodiments, the second network node, the third network node, or a combination thereof are configured with discontinuous reception, connected mode discontinuous reception, or a combination thereof, the second network node, the third network node, or the combination thereof are further configured with a discontinuous reception cycle, an on-duration timer, a discontinuous reception inactivity timer, or some combination thereof.

In one embodiment, the second network node and the third network node jointly communicate with the fourth network node to transmit two sets of layers to the fourth network node corresponding to at least one codeword.

In certain embodiments, the second network node and the third network node forward signals corresponding to two sets of physical downlink shared channel layers corresponding to the two repeaters, and channel state information reference signal symbols corresponding to two channel state information reference signal resources are forwarded via the second network node and the third network node.

In some embodiments, the correlation between the control information corresponding to the second network node and the control information corresponding to the third network node comprises the second network node and the third network node being configured to be turned ON simultaneously, to be over overlapping time slots, with configuration timing for the second network node and the third network node being the same, or some combination thereof.

In various embodiments, the fourth network node is configured with multi-node transmission, reception, or a combination thereof corresponding to at least two nodes selected from a group comprising the first network node, the second network node, and the third network node, and is expected to be configured with a transmission configuration indication codepoint corresponding to two transmission configuration indication states corresponding to demodulation reference signals for a physical downlink shared channel from different code division multiplexing groups.

In one embodiment, the fourth network node is configured with multi-node transmission, reception, or a combination thereof corresponding to at least two nodes selected from a group comprising the first network node, the second network node, and the third network node, and is expected to be configured with a repetition scheme configuration corresponding to a frequency division multiplexing scheme, or a time division multiplexing scheme in a physical downlink shared channel configuration, a physical downlink control channel configuration, a physical uplink shared channel configuration, a physical uplink control channel configuration, or some combination thereof.

In certain embodiments, the fourth network node is configured with multi-node transmission, reception, or a combination thereof corresponding to at least two nodes selected from a group comprising the first network node, the second network node, and the third network node, and wherein the fourth network node: is expected to be configured with a channel state information reporting configuration corresponding to a multi-transmission and reception point transmission scheme, wherein a channel state information reference signal resource set for channel measurement associated with the channel state information reporting configuration is configured with two resource groups and at least one resource pair; is expected to feed back an indication to the network indicating a preference of a hypothesis from a set of multiple hypotheses, the set of multiple hypotheses corresponds to a single-point transmission via one of the first network node, the second network node, and the third network node, corresponding to a single channel state information reference signal resource from one resource group, or joint transmission from at least two of the first network node, the second network node, and the third network node, corresponding to a channel state information reference signal resource pair from the two resource groups, and the indication is in a form of a channel state information reference signal resource identifier; or a combination thereof.

In some embodiments, in response to the second network node and the third network node being configured with a single frequency network scheme for a physical downlink shared channel, a physical downlink control channel, or a combination thereof, the second network node and the third network node are expected to be configured with the same control information, and the second network node and the third network node are configured with different channel state information reference signal resources configured with tracking reference signal information.

In various embodiments, the second network node and the third network node feed back a channel state information reference signal resource indicator comprising a channel state information reference signal resource identifier, a layer-1 reference signal received power, a layer-1 signal to interference and noise ratio, or some combination thereof.

In one embodiment, the second network node and the third network node report a same corresponding to a maximum layer-one reference signal received power, a maximum layer-1 signal to interference and noise ratio, and wherein the second node and the third node are not expected to be configured to be turned ON over overlapping slots.

In certain embodiments, at least one channel state information reference signal resource indicator corresponds to one or more channel state information reference signal resources, and wherein the second network node and the third network node are not expected to be configured to be turned ON over overlapping time slots if: the second network node is configured with a beam corresponding to a channel state information reference signal resource that is indicated within the channel state information reference signal resource indicator corresponding to the third network node; the third network node is configured with a beam corresponding to a channel state information reference signal resource that is indicated within the channel state information reference signal resource indicator corresponding to the second network node; or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a network node, the method comprising:
    transmitting an indication of repeater-assisted communication to at least one repeater node; and
    transmitting configuration information, to the at least one repeater node, comprising control information that corresponds to whether the at least one repeater node is turned on or turned off, the control information indicating timing information for the at least one repeater node, and the timing information indicating whether the at least one repeater node is expected to transmit a signal received at the at least one repeater node at a prior time to the network node, a user equipment (UE) node, or a combination thereof based on the configuration information.

2. The method of claim 1, wherein the at least one repeater node is associated with an identification number.

3. The method of claim 1, wherein the at least one repeater node comprises two repeater nodes.

4. The method of claim 3, wherein the control information activates the two repeater nodes according to an alternating order, or over non-overlapping time slots, or a combination thereof.

5. The method of claim 4, wherein the alternating order is based on a a respective identification number associated with each repeater node of the two repeater nodes.

6. The method of claim 3, wherein each of the two repeater nodes jointly communicate, according to the configuration information, with the UE node for transmission of two sets of layers to the UE node corresponding to at least one codeword.

7. The method of claim 6, wherein each of the two repeater nodes forwards signals corresponding to two sets of physical downlink shared channel (PDSCH) layers according to the configuration information, and wherein each of the two repeater nodes forwards channel state information reference signal (CSI-RS) symbols corresponding to two CSI-RS resources according to the configuration information.

8. The method of claim 6, wherein the control information corresponding to the first of the two repeater nodes configures the two repeater nodes to be turned on simultaneously, to be over overlapping time slots, with configuration timing for a first of the two repeater nodes and a second of the two repeater nodes being the same, or a combination thereof.

9. The method of claim 6, further comprising configuring the UE node with multi-node transmission, reception, or a combination thereof corresponding to at least two nodes selected from a group comprising the network node, and the two repeater nodes, and is expected to be configured with a transmission configuration indication (TCI) codepoint corresponding to two TCI states corresponding to demodulation reference signals (DMRS) for a PDSCH from different code division multiplexing (CDM) groups.

10. The method of claim 6, further comprising configuring the UE node with multi-node transmission, reception, or a combination thereof corresponding to at least two nodes selected from a group comprising the network node, and the two repeater nodes, and is expected to be configured with a repetition scheme configuration corresponding to a frequency division multiplexing (FDM) scheme, or a time division multiplexing (TDM) scheme in a PDSCH configuration, a physical downlink control channel (PDCCH) configuration, a physical uplink shared channel (PUSCH) configuration, a physical uplink control channel (PUCCH) configuration, or a combination thereof.

11. The method of claim 6, further comprising configuring the UE node for multi-node transmission, reception, or a combination thereof corresponding to at least two nodes selected from a group comprising the network node, and the two repeater nodes, and wherein the UE node, according to the configuration information:
    is expected to be configured with a channel state information (CSI) reporting configuration corresponding to a multi-transmission and reception point (TRP) transmission scheme, wherein a CSI reference signal (CSI-RS) resource set for channel measurement associated with the CSI reporting configuration is configured with two resource groups and at least one resource pair;
    is expected to feed back an indication to the network node indicating a preference of a hypothesis from a set of multiple hypotheses, the set of multiple hypotheses corresponds to a single-point transmission via one node of the network node, and the two repeater nodes, corresponding to a single CSI-RS resource from one resource group, or joint transmission from at least two nodes of the network node, and the two repeater nodes, corresponding to a CSI-RS resource pair from the two resource groups, and the indication is in a form of a CSI-RS resource identifier;
    or a combination thereof.

12. The method of claim 6, wherein, in response to the two repeater nodes being configured, according to the configuration information, with a single frequency network scheme for a PDSCH, a physical downlink control channel (PDCCH), or a combination thereof, the two repeater nodes are expected to be configured with the same control information, and the two repeater nodes are configured with different channel state information reference signal (CSI-RS) resources configured with tracking reference signal (TRS) information.

13. The method of claim 3, wherein the two repeater nodes feed back, according to the configuration information, a channel state information reference signal (CSI-RS) resource indicator (CRI) comprising a CSI-RS resource identifier, a layer-1 reference signal received power, a layer-1 signal to interference and noise ratio, or some combination thereof.

14. The method of claim 13, wherein the two repeater nodes, according to the configuration information, report a same CRI corresponding to a strongest beam corresponding to a maximum layer-one reference signal received power, a maximum layer-1 signal to interference and noise ratio, and wherein the two repeater nodes are not expected to be configured to be turned on over overlapping slots.

15. The method of claim 13, wherein at least CRI corresponds to one or more CSI-RS resources, and wherein the two repeater nodes, according to the configuration information, are not expected to be configured to be turned on over overlapping time slots if:
    a first of the two repeater nodes is configured with a beam corresponding to a CSI-RS resource that is indicated within the CRI corresponding to a second of the two repeater nodes;
    the second of the two repeater nodes is configured with a beam corresponding to a CSI-RS resource that is indicated within the CRI corresponding to the first of the two repeater nodes;
    or a combination thereof.

16. The method of claim 1, wherein the indication of repeater-assisted communication is based on:
- downlink control information (DCI) with a specified format, wherein the DCI comprises an indicator corresponding to whether the at least one repeater node is turned on or turned off;
- a control information signal that corresponds to communication between the network node and the at least one repeater node;
- a higher-layer parameter;
- a control information sequence that does not include symbols of a demodulation reference signal;
- or a combination thereof.

17. The method of claim 1, wherein the control information is configured with a time-domain behavior set to a behavior selected from a group comprising: a periodic time-domain behavior with a configured periodicity, an aperiodic time-domain behavior, and a semi-persistent time-domain behavior.

18. The method of claim 1, wherein the at least one repeater node is configured with discontinuous reception (DRX), connected mode DRX, or a combination thereof, the at least one repeater node is further configured with a DRX cycle, an on-duration timer, a discontinuous reception inactivity timer, or a combination thereof.

19. An apparatus for wireless communication, the apparatus comprising:
- a processor; and
- a memory coupled to the processor, the memory comprising instructions executable by the processor to cause the apparatus to:
  - transmit an indication of repeater-assisted communication to at least one repeater node; and
  - transmit configuration information, to the at least one repeater node, comprising control information that corresponds to whether the at least one repeater node is turned on or turned off, the control information indicating timing information for the at least one repeater node, and the timing information indicating whether the at least one repeater node is expected to transmit a signal received at the at least one repeater node at a prior time to the apparatus, a user equipment (UE) node, or a combination thereof based on the configuration information.

20. An apparatus for wireless communication, the apparatus comprising:
- a processor; and
- a memory coupled to the processor, the memory comprising instructions executable by the processor to cause the apparatus to:
  - receive an indication of repeater-assisted communication from a network node; and
  - receive configuration information, from the network node, comprising control information that corresponds to whether at least one repeater node is turned on or turned off, the control information indicating timing information for the at least one repeater node, and the timing information indicating whether the at least one repeater node is expected to transmit a signal received at the at least one repeater node at a prior time to the network node, a user equipment (UE) node, or a combination thereof based on the configuration information.

\* \* \* \* \*